United States Patent Office 3,110,588
Patented Nov. 12, 1963

3,110,588
BRAZING ALLOY
Paul R. Mobley, Cincinnati, Ohio, assignor to General
Electric Company, a corporation of New York
No Drawing. Filed Nov. 24, 1961, Ser. No. 154,831
6 Claims. (Cl. 75—171)

This invention relates to brazing alloys and particularly to an improved nickel-chromium base brazing alloy especially suitable for joining, through brazing, components made of nickel base structural alloys including titanium and aluminum.

The use of nickel base structural alloys hardened in part by titanium and aluminum in components of high performance power producing apparatus such as aircraft gas turbines has becomes wide spread. One of these alloys, sometimes referred to a René 41 nickel base alloy, described in U.S. Patent 2,945,758, Jahnke et al., can be heat treated in the range of 1900–2050° F. prior to aging at about 1400° F. to develop maximum tensile properties. Therefore, in the manufacture of articles from this type of material involving the brazing of components, it was desirable to provide a brazing alloy having a brazing temperature in that range. The brazing alloys currently available for brazing at that temperature are lacking either in strength and oxidation resistance or are highly erosive to such a structural alloy. For example, some known commercial nickel base brazing alloys that have a brazing temperature of about 1950° F. will attack and erode René 41 alloy by boron and silicon penetration.

A principal object of this invention is to provide a nickel-chromium base brazing alloy having a brazing temperature in the range of 1900–2075° F. and which will not produce critical deterioration of the base metal properties of nickel base alloys, including the elements titanium and aluminum, through erosion, inter-granular penetration and excessive brazing temperatures.

Another object is to develop such a nickel base brazing alloy which is strong and oxidation resistant up to an operating temperature of about 1600° F. and which is capable of capillary flow in a vacuum.

These and other objects and advantages will be recognized from the following detailed description, the examples which are meant to be exemplary of rather than limitations on the scope of the present invention.

Briefly stated, the present invention provides a nickel-chromium base brazing alloy consisting, by weight, essentially of, 4.5–15% Cu, 17.5–25% Ge, 0.1–1.6% Ti with the balance nickel, chromium and incidental impurities which do not affect the alloy.

It was found that the alloy of this invention, through a careful balance of its elements, provides an unusual combination of properties: (1) it has a brazing temperature in the range of 1900–2075° F.; (2) it does not erode nickel base alloys including titanium and aluminum; (3) it has excellent oxidation resistance up to about 1700° F. in air and has good shear-tensile and shear-rupture strength.

The following table is representative of forms of brazing alloys within and outside the range of the alloy of the present invention:

TABLE I

| Example | Percent By Weight | | | | | | | | |
|---|---|---|---|---|---|---|---|---|---|
| | Ni | Cr | Cu | Ge | Ti | Pd | Al | Cb | Si |
| P36 | Bal. | | 40 | 25 | | 5 | | | |
| G1 | Bal. | 18.3 | 4.8 | 21.2 | 1.6 | | | | |
| MG1 | Bal. | 24 | 5 | 24 | 1 | | | | |
| G2 | Bal. | 20.3 | 4.3 | 17.5 | | | | 3.9 | |
| P45 | Bal. | 16 | | 25 | | 15 | | 4 | |
| P53 | Bal. | 16.5 | 4.5 | 17.5 | 0.1 | | | | |
| P54 | Bal. | 18.6 | 5.5 | 22.5 | 1 | | | | |
| P58 | Bal. | 20.9 | 5 | 28.8 | 1 | | 1 | | |
| P59 | Bal. | 16.5 | 15 | 28.8 | | | 1 | | |
| P62 | Bal. | 18 | 5 | 24.7 | 1 | | | | 0.75 |

Within the range of this invention, the alloys G1, P53, P54 and MG1 are typical. It has been recognized that within this alloy range incidental impurities such as carbon, iron, oxygen, nitrogen, hydrogen, etc. which do not affect the properties of the alloy sometimes are introduced during production of the alloy. However up to about 0.1 weight percent such impurities have not been found to be detrimental. Of the alloys in Table I, form G1 is the specific preferred form.

Although the element germanium has been included in certain ranges in brazing alloys, such as that described in U.S. Patent 2,901,347, McGurty et al., and as an optional addition in U.S. Patent 2,856,281, Cremer et al., in the alloy of the present invention germanium serves four purposes: (1) it increases the alloy's room temperature toughness, (2) it adjusts the melting point range, (3) it improves oxidation resistance and room temperature ductility and (4) within the range selected to adjust the melting point, amounts of germanium larger than amounts of other elements such as silicon and boron which are erosive in small quantities, can be used without causing the erosion of nickel base alloys such as René 41 alloy. It has been found that the inclusion of germanium in excess of about 25 weight percent will cause serious erosion of such alloys. However the addition of germanium within the range of this invention particularly coupled with copper avoids an erosion effect while at the same time the copper improves ductility.

However, with the other elements of the alloy, copper included a range above about 15 weight percent has been found to increase the rate of erosion as will be pointed out later in connection with the discussion of Examples P36 and P59. Thus, copper plays a significant part in providing non-erosive characteristics and good ductility.

Referring now to Table I, although alloy P36 brazed well at about 1975° F., it was too erosive and had poor oxidation resistance at about 1500° F. Alloy G2, including columbium for the purpose of strengthening by solution hardening, was erosive and resulted in poor oxidation resistance as well. Alloy P45 had too high a brazing temperature (2150° F.) and in addition was too erosive to René 41 alloy. Alloy P58, including a larger amount of germanium along with the addition of aluminum, was a strong oxidation resistant alloy but was too erosive to René 41 alloy during brazing. Alloy P59, including larger amounts of copper and germanium along with aluminum instead of titanium, again was a stronger alloy but was too erosive although its brazing temperature was in the proper range. Alloy P62 including 0.75% Si was a satisfactory alloy although it showed no improvement over the other alloys listed. The alloys G1, P53, P54 and P62, even though the latter included a small amount of silicon without effect, all met the requirements of brazing in the range of about 1900–2075° F., were not erosive to nickel base alloys including titanium and aluminum, had good oxidation resistance at least up to 1500° F. and had good strength properties.

The alloys of Table I were made by well known vacuum induction melting techniques for the manufacture of brazing alloys. In this case the alloy melt was heated to about 2400° F. and then poured in an inert gas atmosphere to form flakes. The alloy flakes were then pulverized into powder by standard methods and equipment.

The following table gives the strength properties of alloys within the range of this invention:

TABLE II

*Average Strength Properties*

| Temperature (° F.) | Indicated Shear-Tensile, p.s.i. | Indicated Shear-Rupture (p.s.i. for 100 hrs.) |
|---|---|---|
| Room | 25,500 | |
| 1,250 | 30,000 | 10,000 |
| 1,450 | 24,000 | 3,500 |

The specimens tested above were brazed at 1950° F. in vacuum by first mixing the powdered alloy with a binder such as of the acrylic resin type to form a paste and then applying the paste to the joint to be brazed.

Although this invention has been described in connection with specific examples, it will be readily recognized by those skilled in the metallurgical arts, the modification and variations of which this invention is capable.

What is claimed is:

1. A nickel base brazing alloy particularly useful for joining nickel base alloys including the elements titanium and aluminum, consisting essentially, by weight, of: 16–24% Cr; 4.5–15% Cu; 17.5–25% Ge; 0.1–1.6% Ti with the balance nickel and incidental impurities.

2. A nickel base brazing alloy particularly useful for joining nickel base alloys including the elements titanium and aluminum, consisting essentially, by weight, of: 16–24% Cr; 4.5–5.5% Cu; 17.5–25% Ge; 0.1–1.6% Ti with the balance nickel and incidental impurities.

3. A nickel base brazing alloy particularly useful for joining nickel base alloys including the elements titanium and aluminum, consisting essentially, by weight, of: 18.3% Cr; 4.8% Cu; 21.2% Ge; 1.6% Ti with the balance nickel and incidental impurities.

4. A nickel base brazing alloy particularly useful for joining nickel base alloys including the elements titanium and aluminum, consisting essentially, by weight, of: 16.5% Cr; 4.5% Cu; 17.5% Ge; 0.1% Ti with the balance nickel and incidental impurities.

5. A nickel base brazing alloy particularly useful for joining nickel base alloys including the elements titanium and aluminum, consisting essentially, by weight, of: 18.6% Cr; 5.5% Cu; 22.5% Ge; 1% Ti with the balance nickel and incidental impurities.

6. A nickel base brazing alloy particularly useful for joining nickel base alloys including the elements titanium and aluminum, consisting essentially, by weight, of: 24% Cr; 5% Cu; 24% Ge; 1% Ti with the balance nickel and incidental impurities.

References Cited in the file of this patent

UNITED STATES PATENTS

| | | |
|---|---|---|
| 2,730,443 | Post et al. | Jan. 10, 1956 |
| 2,815,282 | Rhodes et al. | Dec. 3, 1957 |
| 2,847,302 | Long | Aug. 12, 1958 |
| 2,856,281 | Cremer et al. | Oct. 14, 1958 |
| 2,900,251 | Evans et al. | Aug. 18, 1959 |
| 2,901,347 | McGurty et al. | Aug. 25, 1959 |
| 2,903,353 | Bredzs | Sept. 8, 1959 |
| 2,988,446 | Rhys | June 13, 1961 |
| 3,053,652 | Mobley et al. | Sept. 11, 1962 |